(No Model.) 3 Sheets—Sheet 1.
S. T. WELLMAN & G. W. GOETZ.
APPARATUS FOR THE MANUFACTURE OF GAS.
No. 376,836. Patented Jan. 24, 1888.
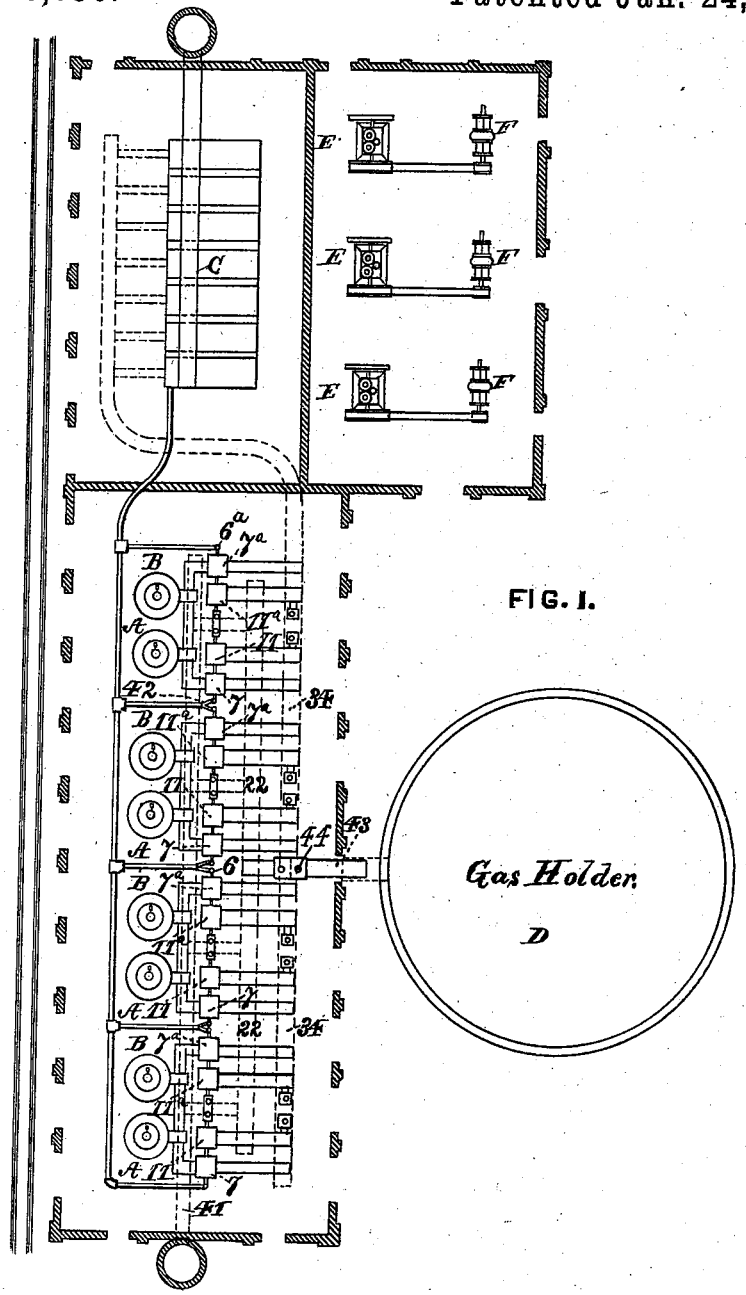
FIG. I.
WITNESSES
INVENTORS
Attorney

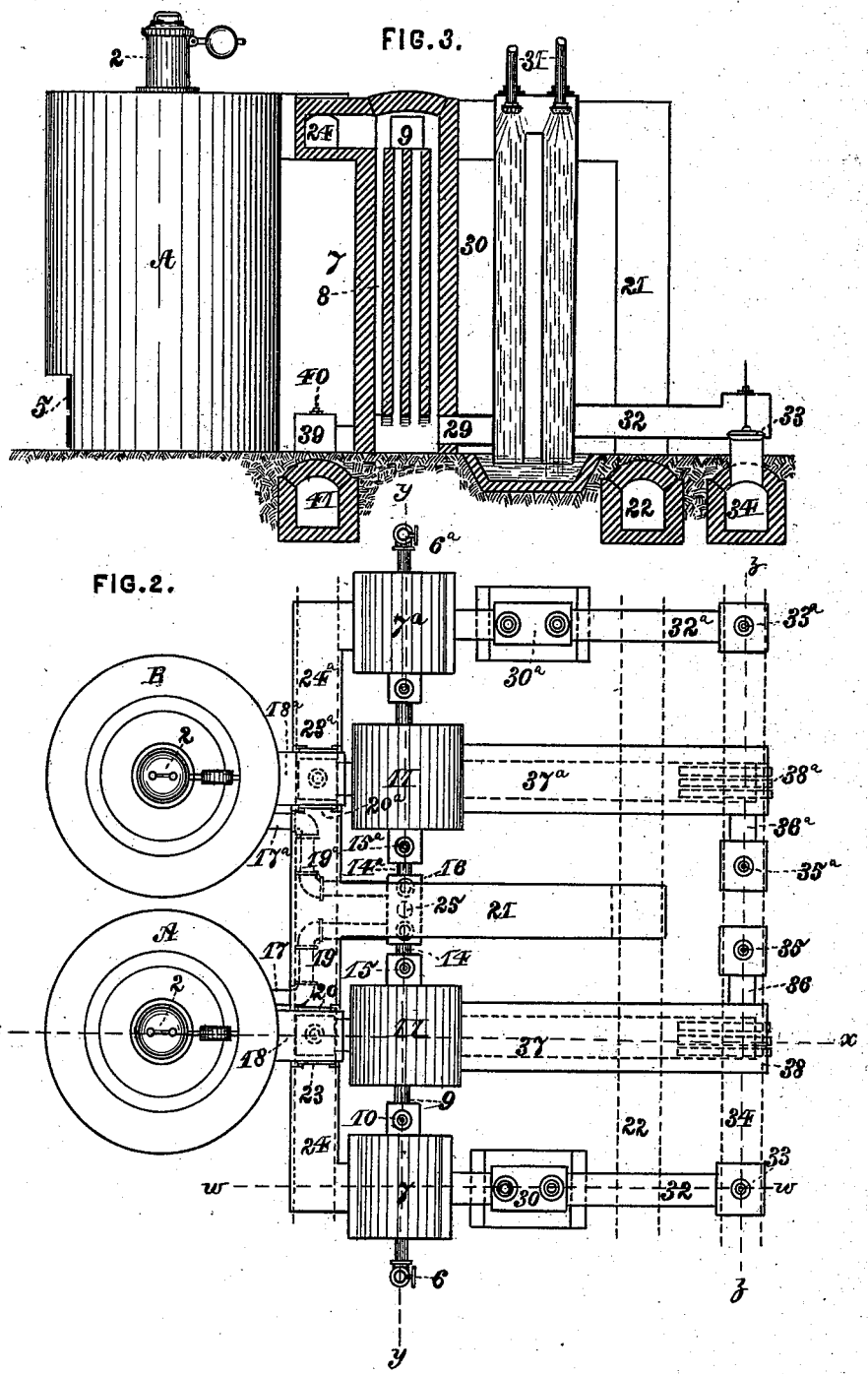

(No Model.) 3 Sheets—Sheet 3.
S. T. WELLMAN & G. W. GOETZ.
APPARATUS FOR THE MANUFACTURE OF GAS.
No. 376,836. Patented Jan. 24, 1888.
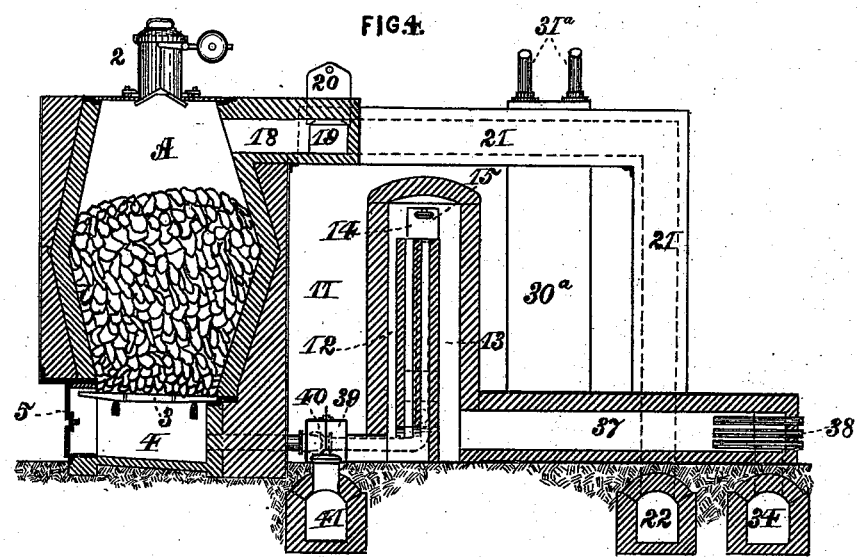
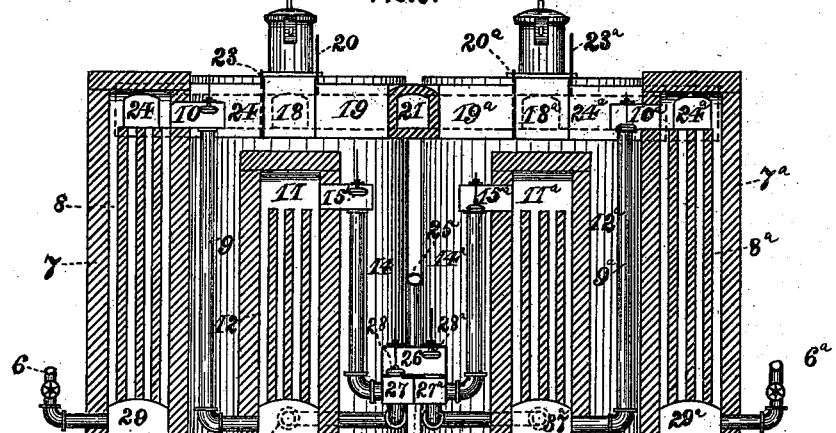
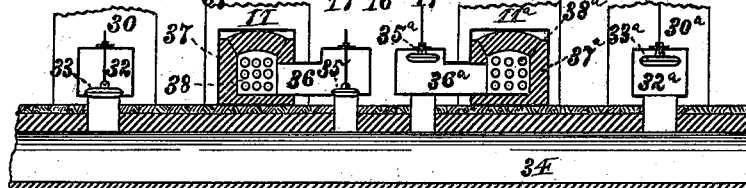

UNITED STATES PATENT OFFICE.

SAMUEL T. WELLMAN AND GEORGE W. GOETZ, OF CLEVELAND, OHIO, ASSIGNORS TO THE FUEL GAS AND ELECTRIC ENGINEERING COMPANY, (LIMITED,) OF PITTSBURG, PENNSYLVANIA.

APPARATUS FOR THE MANUFACTURE OF GAS.

SPECIFICATION forming part of Letters Patent No. 376,836, dated January 24, 1888.

Application filed February 24, 1887. Serial No. 228,674. (No model.)

*To all whom it may concern:*

Be it known that we, SAMUEL T. WELLMAN and GEORGE W. GOETZ, residing at Cleveland, in the county of Cuyahoga and State of Ohio, citizens of the United States, have invented or discovered certain new and useful Improvements in Apparatus for the Production of Heat, Light, and Power, of which improvements the following is a specification.

In the accompanying drawings, which make part of this specification, Figure 1 is a plan view of our improved plant for the production of heat, light, and power. Fig. 2 is a plan view of one of the gas-generating parts of the plant. Fig. 3 is a sectional elevation, the section being taken on the line $w w$, Fig. 2. Figs. 4 and 5 are similar views on the lines $x x$ and $y y$, respectively, of Fig. 2. Fig. 6 is a sectional view through the producer-gas conduit on the line $z z$, Fig. 2.

The invention relates to certain improvements in plants or apparatus for the simultaneous but independent production of producer and water gases, said gases being separately delivered for independent utilization, the one for the generation of heat and power in close proximity to the producers and the other for conveyance to and utilization at points distant from the gas-generating plant—that is to say, provision is made for the utilization of producer-gas for the generation of power at a point in comparatively close proximity to the producers, for the reason that the producer-gas contains a high percentage of non-combustible gases, and cannot therefore be economically transported to a distance, while the water-gas, which can be most economically manufactured in connection with the producer-gas, and contains a very small percentage of non-combustible gases, can be transported to a distance.

In general terms, the invention consists in the construction and relative arrangement of parts, substantially as hereinafter more fully described and claimed.

In the practice of our invention we provide two gas producers or stacks, A and B, arranged in convenient proximity one to the other, and provided with charging-chutes 2, grate-bars 3, ash-pit 4, and ash-pit doors 5. For convenience in describing the construction, relative arrangement, and operation of our plant, we will suppose that water-gas is being generated in the stack A and producer-gas in the stack B. Steam from the battery of boilers C, which will be hereinafter referred to, is introduced through the pipe 6 into a heater, 7, which is provided with a series of longitudinal passages, 8, or otherwise similarly adapted to present a comparatively large area of internal heating or regenerative surface, and passing up the passages 8 of said heater enters the pipe 9, the valve 10 thereof, which connects the upper end of the heater with the lower end of the superheater 11, being open. The steam having been highly heated in the heater 7 is raised to a temperature approximating that necessary for its decomposition as it passes through the passages 12 of the superheater 11. From the superheater 11 the steam passes through the pipe 14, its valve 15 being open, the lower portion of the box or chest 16 and the pipe 17, into the ash-pit 4 of the stack A. As the steam passes up through the incandescent coal in the stack, it is decomposed and water-gas is formed, which escapes from the stack through the exit-flue 18, and thence by the flue 19, its gate or valve 20 being open, the branch flue 21 into the main water-gas delivery conduit 22. While water-gas is being formed in the stack A, as above described, the gate or valve 23, controlling the connection between the exit-flue 18 and the flue 24, leading to the upper end of the heater 7, is closed.

During the above-described operation air is forced by any suitable device or apparatus through the pipe 25 into the upper compartment, 26, of the box or chest 16, thence into the compartment $27^a$, the valve $28^a$ being open, and through the pipe $17^a$, the valve $15^a$ of the pipe $14^a$, also connected to the compartment $27^a$, being closed, into the ash-pit of the stack B. As the air passes through the ignited coal or other carbonaceous material, the latter is raised to a high temperature and the gas produced by such combustion, termed, for convenience, "producer-gas," escapes by the flue $18^a$ into the flue $24^a$, the valve $23^a$ being open and the valve 20ᵃ closed. From the flue 24ᵃ the gas passes into the heater 7ᵃ, down its passages 8ᵃ into the flue or pipe 29ᵃ, leading to one leg of the scrubber 30ᵃ, which consists of an inverted-U-shaped tube or channel, or a shell or casing having a transverse partition extending nearly to its top, so as to provide avenues for the upward and downward traverse of gas throughout its length between an admission and an exit passage, each located adjacent to its lower end. The gas passing up one leg of the scrubber and down the other, and being during such passage subjected to the cleansing of the water from the sprayers 31ᵃ, escapes through the flue 32ᵃ, the valve 33ᵃ thereof being open into a producer-gas conduit, 34, which leads to the furnaces of a battery of steam-boilers. While the heater 7ᵃ is being heated by the passage of gas from the stack, as above described, the valve 35ᵃ of the flue 36ᵃ, connecting the conduit 34 and the flue 37ᵃ, is opened, thus permitting gas from the conduit to enter the flue 37ᵃ, where it mingles with finely-divided streams of air entering the flue through the pipes 38ᵃ, and being ignited, the flame and products of combustion pass up the passage 13ᵃ of the superheater 11ᵃ and down the passages 12ᵃ and escapes by the flue 39ᵃ, its valve 40ᵃ being open into the chimney-flue 41. As soon as the heater 7, superheater 11, and the incandescent material in the stack A have been reduced in temperature by the steam passing therethrough to a degree too low for the rapid and economic production of water-gas, by which time the heater 7ᵃ, superheater 11ᵃ, and the material in the stack B will have been properly heated in the manner above described, the operation of the plant is reversed—*i. e.*, the several valves are so adjusted that water-gas will be formed in the stack B and producer-gas in the stack A. This change or reversal is effected as follows: The valves 28ᵃ, 23ᵃ, and 33ᵃ are closed, thus stopping the flow of air to and the escape of gas from the stack B and into the conduit 34. At the same time the valve 35ᵃ and a valve corresponding with the valve 40 and governing communication between the superheater 11ᵃ and the chimney-flue 41 are closed, thus stopping combustion in the superheater 11ᵃ and cutting off its connection with the chimney-flue 41. The valve in the steam-pipe 6ᵃ is opened, thus permitting steam to flow into the heater 7ᵃ and up the passages 8ᵃ, thence, on the raising of the valve 10ᵃ by the pipe 9ᵃ, into the superheater 11ᵃ, and up its passages 12ᵃ. The valve 15ᵃ being opened, the now highly-heated steam passes by the pipes 14ᵃ and 17ᵃ, and compartment 27ᵃ of the chest 16, to the ash-pit of the stack B. The valve 20ᵃ being raised, the water-gas formed in the stack B passes by the flues 19ᵃ and 21 to the water-gas conduit 22. Simultaneously, or nearly so, with the above-described operations the valve in the steam-pipe 6 is closed, as are also the valves 10, 15, and 20, thus stopping the flow of steam through the heater 7 and superheater 11 to the stack A and cutting off the communication of the latter with the conduit 22. The valve 28 is now raised, permitting the air-blast to flow through the compartments 26 and 27 of the chest 16, and through the pipe 17 into the ash-pit of the stack A. By opening the valves 23 and 33 the gas generated in the stack A is allowed to flow through the flue 24, heater 7, flue 29, scrubber 30, and flue 32, into the producer-gas conduit 34, the gas in its passage through the heater 7 imparting a large amount of its heat to the walls of the passages 8 in said heater.

In order to restore the walls of the superheater to the desired temperature, the valve 35 is raised, and the gas and air flowing into the flue 37 are ignited, the products of combustion passing up the passage 13 and down the several passages 12 and escaping by the flue 39, its valve 40 being opened, into the chimney-flue 41.

The above-described reversals are effected as often as experience shall dictate for the rapid and economic production of water-gas, the latter being the principally-desired product. This water-gas may be distributed through the mains of a city directly from the conduit 22, or may be conducted to a gas-holder, D, by a pipe, 43, and thence distributed at a regulated pressure to the city mains.

If desired, scrubbers 44 (see Fig. 1) may be connected with the pipe 43, leading to the gas-holder D, in order to cleanse the water-gas; or, if preferred, such scrubbers may be connected with the flues 21, leading from each gas apparatus.

In order to utilize the excess of producer-gas necessarily formed in a single apparatus, as above described, or in a plant consisting of a series of such apparatus, as shown in Fig. 1, a battery, C, of boilers is located in close or convenient proximity to the gas-plant, the furnaces of said boilers being connected with the producer-gas main, as shown in dotted lines in Fig. 1, and the producer-gas is burned under said boilers, thereby generating steam, a part of which is conducted to the gas-plant by the pipe 42, the pipes 6 and 6ᵃ being connected therewith for the production of water-gas, the residue of the steam being utilized to drive the engines E, to which may be connected dynamo-electric machines F, for the purpose of furnishing light and power at a distance from the plant.

We claim herein as our invention—

1. In a plant for the production of heat, power, and light, the combination of two stacks or producers, heaters having a valved connection with the exit-flues of the stacks and with a producer-gas-delivery conduit, superheaters having valved connections with the heaters and with the ash-pits of the stacks, and a steam-pipe leading into the heaters, substantially as set forth.

2. In a plant for the production of heat, power, and light, the combination of two stacks or producers having valved connections with independent producer and water gas delivery conduits, heaters arranged in the line of said connections with the producer-gas conduit, a blast-pipe having valved connections with the ash-pits of the stacks, superheaters having valved connections with the heaters and with the ash-pits of the stacks, and a steam-pipe for conducting steam into the heaters, substantially as set forth.

In testimony whereof we have hereunto set our hands.

SAMUEL T. WELLMAN.
GEORGE W. GOETZ.

Witnesses:
THOS. H. BROOKS,
W. H. SHEPARD.